United States Patent Office 3,582,318
Patented June 1, 1971

3,582,318
HEAT-RESISTANT CRACK-RESISTANT DUCTILE
STEEL WELD DEPOSIT
Edwin R. Szumachowski, Springettsbury Township, York County, Pa., assignor to The McKay Company, Pittsburgh, Pa.
No Drawing. Continuation-in-part of application Ser. No. 445,728, Apr. 5, 1965. This application Sept. 5, 1967, Ser. No. 665,304
Int. Cl. C22c *39/26*
U.S. Cl. 75—122                                        2 Claims

ABSTRACT OF THE DISCLOSURE

A heat-resistant high silicon chromium-nickel austenitic steel weld deposit possessed of good ductility and superior crack resistance consisting essentially of the following composition:

| | Percent |
|---|---|
| Carbon | 0.4 maximum |
| Manganese | 2.5 to 9.0 |
| Silicon | 0.50 to 1.20 |
| Chromium | 14.0 to 30.0 |
| Nickel | 28.0 to 50.0 |
| Iron | 12.0 minimum |
| Molybdenum | 0 to 4.0 |

Manganese equivalent (percent Mn+20 x percent C+.25 x percent Mo—4 x percent Si)—4.7 minimum.

---

This application is in part a continuation of my copending application Ser. No. 445,728, filed Apr. 5, 1965, now abandoned.

This invention relates to heat-resistant high silicon chromium-nickel austenitic steel weld deposits; more particularly, it relates to ductile heat-resistant high silicon chromium-nickel austenitic steel weld deposits having superior crack resistance. Such deposits may be produced by any of the known welding processes.

Heat-resistant chromium-nickel austenitic steels such as Alloy Casting Institute Grade HT, type 330, RA–330 and RA–333, the RA designating alloys produced and marketed by Rolled Alloys, Inc., are well known. Composition limits of these steels are given in Table 1.

Grade HT, having low ductility due to its high carbon content, is produced in the cast form; Type 330 is similar to HT except that it has been modified for greater ductility so that it can be produced in wrought form. RA–330 and RA–333 are both produced in the wrought form, having good ductility by virtue of their low carbon content. In general, the higher silicon contents of Grade HT, RA–330 and RA–333 provide these alloys with heat resistance superior to that of Type 330.

In attempting to weld the above described steels prior workers encountered several problems. When weld deposits were designed with carbon and silicon contents matching those of the compositions of Table 1 it was found that (a) low carbon-high silicon weld deposits with analyses similar to RA–330 or RA–333 have good ductility, heat resistance and strength, but are so crack sensitive that they are commercially non-usable; (b) weld deposits having moderately low carbon and low silicon in the range of the Type 330 analysis have superior ductility but are still crack sensitive; (c) weld deposits with high carbon and high silicon of the order of the carbon and silicon contents of Grade HT material have relatively good crack resistance, apparently obtained by increasing the carbon content, but their ductility is too low for broad commercial usability.

In view of the prior failures to obtain weld deposits possessing the desirable combination of good ductility, good crack resistance and high silicon for heat resistance, fabricators have resorted to the use of several different deposit analyses for welding heat resistant austenitic chromium-nickel steels of the types described in Table 1. Typical analysis ranges for these deposits are listed in Table 2 as Types A, B and C. From the tables it will be seen that the analysis of Type A weld deposit corresponds closely to that of Type 330 wrought material; this weld deposit has good ductility but poor crack resistance. Type B weld deposit has an analysis which is similar to RA–330 wrought material with the exception that the carbon of the weld deposit is considerably higher than the carbon of the wrought material; it has heretofore been felt that increased carbon is necessary to provide reasonably good crack resistance in the high silicon weld deposits (high silicon is desirable for optimum heat resistance), but the high carbon also imparts poor ductility to the deposits. Type C weld deposit is essentially identical in analysis to RA–333 wrought material; since it has low carbon and high silicon, its ductility is superior to that of Type B and its heat resistance is superior to that of Type A, but its crack resistance is poor. Due to the addition of the alloying elements molybdenum, tungsten and cobalt, both the Type C weld deposit and the RA–333 wrought material are of higher strength than the Type B weld deposit and RA–330 wrought material.

It should be apparent that the above described approach to solving the problems of low ductility and/or crack sensitivity in heat resistant high silicon austenitic chromium-nickel steel weld deposits is not completely satisfactory, because that approach does not produce weld deposits of this type which are both ductile and crack resistant. A major problem has been to maintain reasonably high silicon for heat resistance in the deposit, while still obtaining good ductility and crack resistance.

I have discovered that superior crack resistance can be obtained in a ductile heat resistant high silicon austenitic chromium-nickel steel weld deposit by suitably adjusting the deposit chemistry within limits hereinafter specified while maintaining the factor which I designate the manganese equivalent (percent Mn+20 x percent C+.25 x percent Mo—4 x percent Si) above a value of 4.7.

I provide a heat resistant high silicon chromium-nickel austenitic steel weld deposit possessed of good ductility and superior crack resistance consisting essentially of the following composition:

| | Percent |
|---|---|
| Carbon | 0.4 maximum |
| Manganese | 2.5 to 9.0 |
| Silicon | 0.50 to 1.20 |
| Chromium | 14.0 to 30.0 |
| Nickel | 28.0 to 50.0 |
| Molybdenum | 0 to 4.0 |
| Iron | ([1]) |

Mn equivalent—4.7 minimum.

[1] Balance—12.0% minimum.

I prefer a heat resistant high silicon chromium-nickel austenitic steel weld deposit wherein the composition consists essentially of the following listed elements in the percentages stated:

| | Percent |
|---|---|
| Carbon | 0.10 to 0.25 |
| Manganese | 3.5 to 7.5 |
| Silicon | 0.60 to 1.00 |
| Chromium | 15.0 to 27.0 |
| Nickel | 28.0 to 50.0 |
| Molybdenum | 0.0 to 3.0 |
| Iron | (1) |

Mn equivalent—5.3 minimum.

[1] Balance—12.0% minimum.

The reasons for selecting the above listed chemistry limits are as follows:

Carbon: As carbon increases ductility decreases; this decrease in ductility becomes excessive above about 0.4% carbon and is especially noticeable when the silicon of the weld deposit approaches 1.00%.

Manganese: With 2.5–9.0% manganese, good to excellent crack resistance can be obtained. Below 2.5% manganese it becomes difficult to achieve good crack resistance. 9% manganese insures good results and is difficult to exceed with many welding methods.

Silicon: Over 0.5% silicon is needed for the best oxidation resistance at high temperatures, but if silicon is above 1.20% it becomes extremely difficult to obtain both good crack resistance and ductility. A desirable typical silicon content is 0.80%.

Chromium and nickel: To satisfy the basic requirement of the alloy system.

Molybdenum: Included in formula for manganese equivalent because it is contained to 4.0% maximum in some of the wrought materials and it does aid slightly in obtaining good crack resistance. Since molybdenum is not nearly as effective as carbon and manganese in obtaining crack resistance and is relatively expensive, it is not likely to be employed in weld metals as a major ingredient for good crack resistance.

Manganese equivalent: The limit of 4.7 minimum value is to assure superior crack resistance; the higher the manganese equivalent the better the crack resistance.

The impurities phosphorus and sulfur should be minimal in the deposit since they contribute to cracking. Typical amounts of these elements present in my deposits are 0.020% P and 0.010% S.

I provide weld deposits specifically for use with ACI Grade HT, Type 330, RA–330 and RA–333 base materials and other base materials of similar compositions. For example, my weld deposit for use with Type 330 base material may be as follows:

| | Percent |
|---|---|
| Carbon | 0.25 maximum |
| Manganese | 3.5 to 7.0 |
| Silicon | 0.50 to 0.90 |
| Chromium | 14.0 to 20.0 |
| Nickel | 33.0 to 37.0 |
| Molybdenum | 0 to 0.6 |
| Iron | (1) |

Mn equivalent—4.7 minimum.

[1] Balance—30.0% minimum.

Also my weld deposit for use with base material of the group consisting of ACI Grade HT and RA–330 may be as follows:

| | Percent |
|---|---|
| Carbon | 0.10 to 0.25 |
| Manganese | 2.5 to 9.0 |
| Silicon | 0.60 to 1.00 |
| Chromium | 14.0 to 20.0 |
| Nickel | 33.0 to 37.0 |
| Molybdenum | 0 to 0.6 |
| Iron | (1) |

Mn equivalent—4.7 minimum.

[1] Balance—30.0% minimum.

Table 3 lists data on ten heat resistant high silicon austenitic chromium-nickel steel weld deposits, seven of which were made in accordance with my invention (for purposes of comparison, the corresponding analysis ranges from weld deposit types A, B and C in Table 2 have been added). All ten deposits contained nominally 17.5% chromium and 33.5% nickel; the phosphorus and sulfur in all deposits were typically 0.020% and 0.009% respectively. Note that deposits 7 through 10 contain only residual amounts of molybdenum. To determine the crack resistance of these deposits they were applied to mild steel base plate using coated electrodes and procedures similar to those described in the United States Department of Defense Specification MIL–E–22200/3A, Figure 3. Each specimen was bent to a 90° included angle with the weld deposit on the outer surface of the bend—i.e., the plunger of the bending fixture was on the unwelded side of the specimen. After bending, the fissures in the weld deposit were counted; this number is listed in Table 3 for each deposit. A deposit showing less than 10 fissures in this test is considered to have good crack resistance; if no fissures are found, the deposit has excellent crack resistance.

It can be seen from the data in Table 3 that weld deposits in accordance with my invention show significant improvement in crack resistance over normal weld deposits of the heat resistant high silicon austenitic chromium-nickel steel type.

TABLE 1*
[Percent]

| Alloy | C | Mn | Si | Cr | Ni | Mo | Co | W | P | S |
|---|---|---|---|---|---|---|---|---|---|---|
| HT | 0.35–0.75 | 2.0 | 2.5 | 13–17 | 33–37 | 0.5 | | | 0.04 | 0.04 |
| 330 | 0.25 | 2.0 | 1.0 | 14–16 | 33–36 | | | | 0.04 | 0.03 |
| RA–330 | 0.08 | 2.0 | 0.75–1.50 | 17–20 | 34–37 | | | | 0.03 | 0.03 |
| RA–333 | 0.08 | 2.0 | 0.75–1.50 | 24–27 | 44–47 | 2.5–4.0 | 2.5–4.0 | 2.5–4.0 | 0.03 | 0.03 |

*Single values are maximums.

TABLE 2
[Percent]

| | C | Mn | Si | Cr | Ni | Mo | Co | W |
|---|---|---|---|---|---|---|---|---|
| Weld deposit type: | | | | | | | | |
| A | [1] 0.25 | [1] 2.5 | [1] 0.90 | 14–17 | 33–37 | | | |
| B | 0.75–1.00 | [1] 2.5 | 0.60–1.00 | [2] 17 | 33–37 | | | |
| C | [1] .08 | [1] 2.0 | 0.75–1.50 | 24–47 | 44–47 | 2.5–4.0 | 2.5–4.0 | 2.5–4.0 |

[1] Maximum. [2] Minimum.

TABLE 3

Weld Deposit Analysis

| | C | Mn | Si | Mo | Mn eq. | Fissures |
|---|---|---|---|---|---|---|
| Weld deposit Number: | | | | | | |
| 1 | 0.15 | 1.28 | 0.87 | 0.25 | 0.87 | 70 |
| 2 | 0.15 | 1.94 | 9.82 | 0.25 | 1.73 | 60 |
| 3 | 0.22 | 2.10 | 0.95 | 0.25 | 2.78 | 50 |
| 4 | 0.20 | 3.72 | 0.80 | 1.56 | 4.91 | 0 |
| 5 | 0.20 | 8.33 | 0.81 | 0.25 | 9.17 | 0 |
| 6 | 0.15 | 4.50 | 0.75 | 1.79 | 4.95 | 4 |
| 7 | 0.20 | 6.94 | 0.75 | 0.25 | 8.00 | 0 |
| 8 | 0.28 | 6.12 | 0.88 | 0.20 | 8.25 | 0 |
| 9 | 0.20 | 5.44 | 0.71 | 0.20 | 6.65 | 0 |
| 10 | 0.22 | 5.96 | 0.59 | 0.20 | 8.05 | 0 |
| Type A, Table 2 | [1] 0.25 | [1] 2.5 | [1] 0.90 | | | |
| Type B, Table 2 | 0.75–1.00 | [1] 2.5 | 0.65–0.85 | | | |
| Type C, Table 2 | [1] 0.08 | [1] 2.0 | 0.75–1.50 | 2.5–4.0 | | |

[1] Maximum.

While I have described certain present preferred embodiments of the invention it is to be distincly understood that the invention is not limited thereto but may be otherwise variously embodied within the scope of the following claims.

I claim:

1. A heat-resistant chromium-nickel austenitic steel weld deposit for use with heat-resistant chromium-nickel austenitic steels such as ACI grade HT, Type 330, RA–330 and other base materials of similar composition, the deposit having high silicon for heat resistance and being possessed of both good ductility and superior crack resistance and consisting essentially of the following composition:

| | Percent |
|---|---|
| Carbon | 0.25 maximum |
| Manganese | 2.5 to 9.0 |
| Silicon | 0.60 to 1.00 |
| Chromium | 14.0 to 20.0 |
| Nickel | 33.0 to 37.0 |
| Molybdenum | Up to 3.0 |
| Iron | Balance |

Manganese equivalent (percent Mn+20 x percent C+.25 x percent Mo—4 x percent Si)—4.7 minimum.

2. A heat-resistant chromium-nickel austenitic steel weld deposit for use with heat-resistant chromium-nickel austenitic steels such as ACI grade HT, Type 330, RA–330 and other base materials of similar composition, the deposit having high silicon for heat resistance and being possessed of both good ductility and superior crack resistance and consisting essentially of the following composition:

| | Percent |
|---|---|
| Carbon | 0.2 maximum |
| Manganese | 2.5 to 9.0 |
| Silicon | 0.60 to 1.00 |
| Chromium | 14.0 to 20.0 |
| Nickel | 33.0 to 37.0 |
| Iron | Balance |

Manganese equivalent (percent Mn+20 x percent C—4 x percent Si)—4.7 minimum.

References Cited

UNITED STATES PATENTS

| 3,495,977 | 2/1970 | Denhard et al. | 75—128 |
| 3,113,021 | 12/1963 | Witherell | 75—171 |
| 3,223,818 | 12/1965 | Chyle | 75—171 |

RICHARD O. DEAN, Primary Examiner

U.S. Cl. X.R.

75—128, 171

UNITED STATES PATENT OFFICE
CERTIFICATE OF CORRECTION

Patent No. 3,582,318      Dated June 1, 1971

Inventor(s) EDWIN R. SZUMACHOWSKI

It is certified that error appears in the above-identified patent and that said Letters Patent are hereby corrected as shown below:

In the heading to the printed specification, lines 5 and 6, "assignor to The McKay Company, Pittsburgh, Pa." should read --assignor, by mesne assignments, to Teledyne, Inc., Los Angeles, California, a corporation of Delaware--. Column 1, line 27, after "Mo" change the dash to a minus sign; line 28, before "4.7" cancel the dash. Column 2, line 62, before "4.7" cancel the dash. Column 3, line 8, "3.5 to 7.5" should be --3.5 to 7.0--; line 14, before "5.3" cancel the dash. Column 4, line 5, "3.5 to 7.0" should be --2.5 to 7.0--; line 11, before "4.7" cancel the dash; line 24, before "4.7" cancel the dash. Column 5, line 5, in the Si column for weld deposit number 2, "9.82" should be --0.82--; line 40, before "4.7" cancel the dash. Column 6, line 23, "0.2 maximum" should be --0.25 maximum--; line 30, before "4.7" cancel the dash.

Signed and sealed this 14th day of December 1971.

(SEAL)
Attest:

EDWARD M. FLETCHER, JR.      ROBERT GOTTSCHALK
Attesting Officer            Acting Commissioner of Patents